United States Patent [19]
Uetani

[11] Patent Number: 6,154,491
[45] Date of Patent: Nov. 28, 2000

[54] MOTION VECTOR DETECTING METHOD AND APPARATUS

[75] Inventor: Yoshiharu Uetani, Kawasaki, Japan

[73] Assignee: Kabushiki Kaisha Toshiba, Kawasaki, Japan

[21] Appl. No.: 09/140,542

[22] Filed: Aug. 26, 1998

[30] Foreign Application Priority Data

Aug. 27, 1997 [JP] Japan ..................................... 9-231051

[51] Int. Cl.[7] .............................. H04N 7/12; H04N 5/14; H04B 1/66
[52] U.S. Cl. .......................... 375/240; 348/413; 348/416; 348/699
[58] Field of Search ..................................... 348/384, 390, 348/397, 400–402, 413–416, 420, 452, 699, 700, 845, 845.03, 411; 382/232, 234, 236, 238, 240, 244, 248; 375/240; H04N 7/12, 5/14; H04B 1/66

[56] References Cited

U.S. PATENT DOCUMENTS

| | | | |
|---|---|---|---|
| 5,317,397 | 5/1994 | Odaka et al. | 348/416 |
| 5,398,078 | 3/1995 | Masuda et al. | 348/699 |
| 5,475,430 | 12/1995 | Hamada et al. | 348/394 |
| 5,488,419 | 1/1996 | Hui et al. | 348/402 |
| 5,677,735 | 10/1997 | Uneo et al. | 348/415 |
| 5,682,209 | 10/1997 | Borgwardt | 348/699 |
| 5,777,677 | 7/1998 | Linzer et al. | 348/397 |
| 5,832,124 | 11/1998 | Sato et al. | 382/238 |
| 6,018,368 | 1/2000 | Kim et al. | 348/416 |

FOREIGN PATENT DOCUMENTS 7-222176  8/1995  Japan .

OTHER PUBLICATIONS

Kazuhito Suguri, et al., "A Real–Time Motion Estimation and Compensation LSI With Wide Search Range For MPEG2 Video Encoding", IEEE Journal of Solid–State Circuits, vol. 31, No. 11, Nov. 1996, pp. 1733–1741.

Masayuki Mizuno, et al., "A 1.5W Single–Chip MPEG2 MP@ ML Encoder With Low–Power Motion Estimation and Clocking", IEEE International Solid–State Circuits Conference (1997), Session 16/Video and Multimedia Signal Processing/Paper FP 16.2.

*Primary Examiner*—Howard Britton
*Assistant Examiner*—Tung Vo
*Attorney, Agent, or Firm*—Oblon, Spivak, McClelland, Maier & Neustadt, P.C.

[57] ABSTRACT

The first and second fields of an interlaced reference picture are subsampled in the same phase in the horizontal direction to produce a primary search reference picture. The first and second fields of an interlaced motion vector detecting picture are subsampled in different phases to produce a primary search motion vector detecting picture. From the primary search reference picture is extracted a primary search reference block which is similar to a primary search motion vector detecting block which is a partial area in the primary search motion vector detecting picture. A search is made for a candidate field motion vector associated with the primary search reference block. A secondary search is made with the candidate motion vector taken as the search center, thereby detecting final field and frame motion vectors.

22 Claims, 10 Drawing Sheets

- ORIGINAL SAMPLE POINTS IN PRIMARY SEARCH REFERENCE PICTURE
- ◇ SUBSAMPLE POINTS IN FIRST FIELD
- ◆ SUBSAMPLE POINTS IN SECOND FIELD

PRIMARY SEARCH REFERENCE BLOCK

- ORIGINAL SAMPLE POINTS IN PRIMARY SEARCH MV DETECTING PICTURE
- ○ SUBSAMPLE POINTS IN FIRST FIELD
- ● SUBSAMPLE POINTS IN SECOND FIELD

PRIMARY SEARCH MV DETECTING BLOCK

• ORIGINAL SAMPLE POINTS IN PRIMARY SEARCH REFERENCE PICTURE
◇ SUBSAMPLE POINTS IN FIRST FIELD
◆ SUBSAMPLE POINTS IN SECOND FIELD

• ORIGINAL SAMPLE POINTS IN PRIMARY SEARCH REFERENCE PICTURE
□ PRIMARY SEARCH POINTS FOR Ca1
■ PRIMARY SEARCH POINTS FOR Cb1

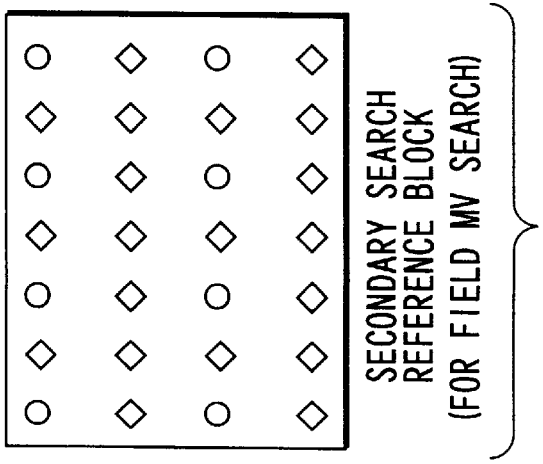
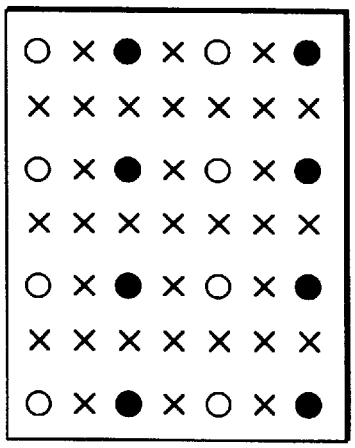
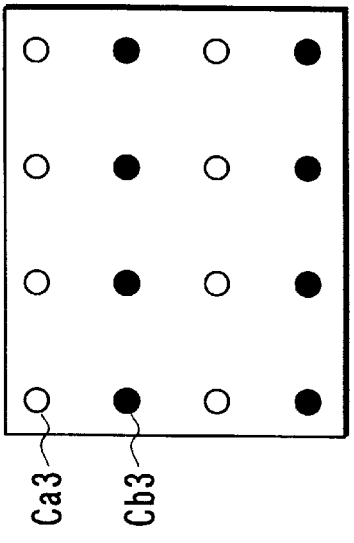
FIG. 3C
FIG. 3B
FIG. 3A

- · ORIGINAL SAMPLE POINTS IN PRIMARY SEARCH REFERENCE PICTURE
- ◇ SUBSAMPLE POINTS IN FIRST FIELD
- ◆ SUBSAMPLE POINTS IN SECOND FIELD

PRIMARY SEARCH REFERENCE BLOCK

- · ORIGINAL SAMPLE POINTS IN PRIMARY SEARCH MV DETECTING PICTURE
- ◇ SUBSAMPLE POINTS IN FIRST FIELD
- ◆ SUBSAMPLE POINTS IN SECOND FIELD

PRIMARY SEARCH MV DETECTING BLOCK

- ORIGINAL SAMPLE POINTS IN PRIMARY SEARCH REFERENCE PICTURE
◇ SUBSAMPLE POINTS IN FIRST FIELD
◆ SUBSAMPLE POINTS IN SECOND FIELD

- ORIGINAL SAMPLE POINTS IN PRIMARY SEARCH REFERENCE PICTURE
□ SEARCH POINTS FOR Ca2
■ SEARCH POINTS FOR Cb2

MOTION VECTOR DETECTING METHOD AND APPARATUS

BACKGROUND OF THE INVENTION

The present invention relates to a video encoding apparatus using for a prediction a motion compensation for use in recording, communicating, transmitting and broadcasting video signals. More specifically, the present invention relates to a method and apparatus for detecting a motion vector which represents that a partial area of a to-be-encoded picture moves from what partial area of a reference picture.

A video signal contains huge amounts of information. Thus, the transmission or recording of such a video signal as simply digitized will require a very wide band transmission line or a very large capacity recording medium. With videophones, teleconference, CATV and image file units, therefore, techniques are employed which encode a video signal with compression to reduce the amounts of video data.

As one of techniques of compression encoding a video signal, a motion estimation and compensation encoding scheme is known. In this scheme, a picture already encoded is taken as the reference picture and a block region in the reference picture is detected which is most highly correlated with a block region of interest in a picture to be encoded. Thereby, a motion vector (MV) is sought which represents which of block regions (referred to as reference blocks) in the reference picture a block region of interest (referred to as a motion vector detecting block) in the to-be-encoded picture corresponds to. A prediction error signal representing the difference between the motion vector detecting block and the reference block indicated by the motion vector is encoded.

In general, the methods of scanning video include a non-interlaced scanning in which all lines of a frame of picture are scanned in sequence and an interlaced scanning in which a complete frame of picture is composed of two fields and the lines of the two fields are interleaved.

When there is no motion between the successive fields in the same frame as in non-interlaced video, a motion estimation and compensation scheme that uses a frame-based motion vector (frame motion vector) becomes useful in many cases. In contrast, in interlaced video, since there is usually motion between the two fields in the same frame, a motion estimation and compensation scheme that uses a field-based motion vector (field motion vector) becomes useful in many cases. The detection of a field motion vector generally requires an overwhelming amount of computation.

In "A Real-Time Motion Estimation and Compensation LSI with Wide Search Range for MPEG-2 Video Encoding" IEEE Journal of Solid-State Circuits, vol. 31, no. 11, pp. 1733 to 1741, November 1996) (literature 1) and "A 1.5W Single-Chip MPEG-2 MP@ML Encoder with Low-Power Motion Estimation and Clocking" ISSCC '97/SESSION 16/VIDEO AND MULTIMEDIA SIGNAL PROCESSING/ PAPER FP 16.2 (literature 2), in order to reduce the amount of computation involved in searching for a field motion vector there are disclosed a technique of detecting a motion vector in two steps: primary search and secondary search.

With a conventional field motion vector detection method, a reference picture and an MV detecting picture for primary search, each of which is composed of subsample points equally spaced by two pixels along the horizontal direction, are created by eliminating pixel sampling points every one pixel along the horizontal direction. Over a wide range of the primary search reference picture, two-pixel accurate motion vector search is performed for primary search points.

Next, using a secondary search reference picture composed of original sample points without subsampling or eliminating, and putting a candidate MV obtained by the primary search process as the central point of a secondary search region, half-pixel accurate MV secondary search is performed over a small region in the neighborhood of that central point. Thereby, the amount of search computation for detecting the motion vector is reduced.

This search area is a secondary search pattern of a motion vector (field motion vector) for a field-based MV detecting block (an MV detecting block composed of subsample points in the first or second field) and a secondary searching pattern of a motion vector (frame motion vector) for a flame-based MV detecting block (an MV detecting block composed of subsample points in the first and second fields). By doing so, the number of samples in a matching block in the primary search process and the number of search points are reduced to ½, allowing the amount of search computation to be reduced to ¼.

In this conventional motion vector detecting method, the subsample points in the primary search reference block and the primary search MV detecting block are identical to one another in phase in the horizontal direction. For this reason, the secondary search for a frame motion vector requires the same number of search points or locations as the secondary search for a field motion vector (a total of 15 points of −1.0 pixel to +1.0 pixel in the horizontal direction and −0.5 pixel to +0.5 pixel in the vertical direction with the center of the secondary search region as the reference).

As in MPEG (Moving Picture Expert Group)-2, in a system in which the number of reference pictures is one or two depending on the picture type, the amount of primary search computation for a motion vector can be reduced when the number of the reference pictures is one. In the conventional system, a surplus of computation processing power is employed only to extend the motion vector search region and cannot be exploited to improve the coding efficiency for usual pictures which are small in motion and hence do not need a large search region.

As described above, the conventional motion vector detecting method which has the amount of search computation reduced has problems that, since the frame motion vector estimation in the primary search is performed with two-pixel accuracy in the horizontal direction, the secondary search with half-pixel accuracy for frame motion vector requires as many search points as are required with field motion vector, and, even if the amount of primary search computation is reduced in the case where the number of reference pictures is one, a surplus of computation processing power cannot be exploited to improve the coding efficiency.

BRIEF SUMMARY OF THE INVENTION

It is an object of the present invention to provide a motion vector detecting method and apparatus which, by detecting a candidate frame motion vector in the primary search with one-pixel accuracy, permits the number of search points required with the frame motion vector secondary search with half-pixel accuracy to be reduced.

It is another object of the invention to provide a motion vector detecting method and apparatus wherein when the amount of primary search computation for a motion vector is reduced, a surplus of search computation processing power is exploited to improve the coding efficiency.

The key point of the present invention is to make a primary search for a motion vector with the phase of subsample points in the horizontal direction made to vary between two fields for either of a primary search reference picture and a primary search motion vector detecting picture.

According to the present invention, there is provided a motion vector detecting method comprising the steps of producing one of a primary search reference picture and a primary search motion vector detecting picture by eliminating first and second fields in the same phase in the horizontal direction, producing the other of the primary search reference picture and the primary search motion vector detecting picture by eliminating first and second fields in different phases in the horizontal direction, searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block, and performing secondary search with the candidate motion vectors taken as the center of search to detect a final field motion vector and a frame motion vector.

According to the present invention, there is provided a motion vector detecting apparatus comprising a first eliminating section for producing one of a primary search reference picture and a primary search motion vector detecting picture by eliminating first and second fields in the same phase in the horizontal direction, a second eliminating section for producing the other of the primary search reference picture and the primary search motion vector detecting picture by eliminating first and second fields in different phases in the horizontal direction, a candidate motion vector detecting section for searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block, and a motion vector detecting section for performing secondary search with the candidate motion vectors taken as the center of search to detect final field and frame motion vectors.

That is, in a first motion vector detecting method of the present invention, a reference picture composed of first and second fields is subsampled in the same phase in the first and second fields along the horizontal direction to produce a primary search reference picture. A motion vector detecting picture composed of first and second fields is subsampled in different phases in the first and second fields to produce a primary search motion vector detecting picture.

In contrast, in a second motion vector detecting method of the present invention, a reference picture composed of first and second fields is subsampled in different phases in the first and second fields along the horizontal direction to produce a primary search reference picture. A motion vector detecting picture composed of first and second fields is subsampled in the same phase in the first and second fields to produce a primary search motion vector detecting picture.

In any of the first and second methods, in the primary search, from the primary search reference picture is extracted a primary search reference block which is a partial area which is similar to a primary search motion vector detecting block which is a partial area of the primary search motion vector detecting picture. A search is made for a candidate field motion vector indicating the position of the primary search reference block relative to each of the first and second fields of the primary search motion vector detecting block. A secondary search is next made with the candidate motion vector as the center for the secondary search to thereby detect final field and frame motion vectors.

By making the primary and the secondary search in this manner, the primary search regions for field motion vectors for the first and second fields of the primary search motion vector detecting block overlap each other in a small-activity region. In the overlapping region, therefore, the primary search will be made with one-pixel accuracy.

That is, the optimum candidate motion vector for the frame-based detecting block in the primary search is a motion vector with one-pixel accuracy because it is detected from a region where the motion vector search regions for the first and second fields of the primary search motion vector detecting block in a small-motion and high-resolution picture overlap each other.

In the motion vector secondary search for the frame-based motion vector detecting block, it suffices to search for a motion vector at a small number of search locations (nine locations within a range from −0.5 to +0.5 pixel in the horizontal and vertical directions) within a small range in the vicinity of the candidate motion vector obtained by the primary search.

In addition, for a picture to be coded (a motion vector detecting picture) which does not require the amount of search computation very much in the primary search, i.e., when backward-prediction motion vector detection is not required over one picture, use is made of two types of primary search motion vector detecting pictures produced by subsampling first and second fields in different phases in the horizontal direction to detect a candidate field motion vector.

By doing so, since points of candidate motion vectors based on two types of primary search motion vector detecting blocks are interpolated, the candidate motion vector for each field of the motion vector detecting block is obtained at one-pixel accuracy. This allows the amount of search computation even a small-motion picture involves to be exploited to improve the coding efficiency. In addition, the number of sampled pixels in a reference picture for primary search remains unchanged from the conventional one, which makes it unnecessary to increase the storage capacity for the reference picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A, 3B and 3C show a field motion vector secondary search reference block, a frame motion vector secondary search reference block, and a secondary search motion vector detecting block, respectively, in the first embodiment;

DETAILED DESCRIPTION OF THE INVENTION

A motion vector detecting method according to a first embodiment of the present invention will be described hereinafter in the order of the primary search and the secondary search.

Figure 1A:
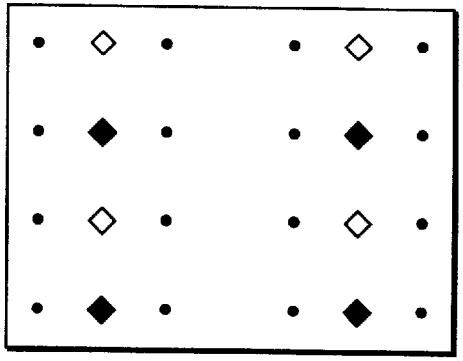
FIGS. 1A and 1B show a primary search reference block and a primary search motion vector detecting block, respectively, in a motion vector detecting method according to a first embodiment of the present invention.
Figure 1B:
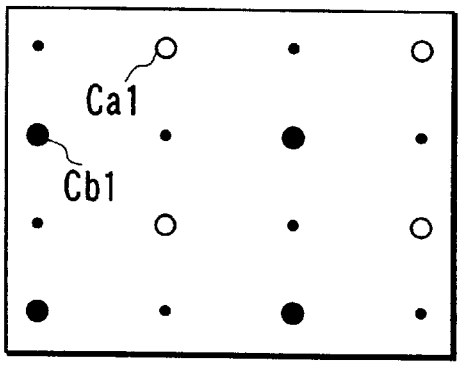

In the primary search for a motion vector (field motion vector), a primary search reference picture and a primary search MV detecting picture, which are composed of a first field (for example, an odd-numbered field) and a second field (for example, an even-numbered field), are produced first. FIGS. 1A and 1B show partial areas (blocks) in the same location of the primary search reference picture and the primary search MV detecting picture, respectively. In FIGS. 1A and 1B, original sample points are indicated by (•) and subsample points are indicated by (○,●).

The subsample points in the primary search reference picture, indicated by (◇,◆), are obtained, as shown in FIG. 1A, by interpolating between the original sample points in the first and second fields constituting one reference picture along the horizontal direction and then removing every other interpolated point in the same phase in the first and second fields.

In contrast, the subsample points (○,●) in the primary search MV detecting picture are obtained, as shown in FIG. 1B, by interpolating between the original sample points in the first and second fields constituting the MV detecting picture along the horizontal direction and then eliminating every other interpolated point in different phases between the first and second fields. In other words, the first and second fields are deviated in phase to each other by eliminating the interpolated point while shifting it by one pixel between the first and second fields in the horizontal direction.

A primary search reference block that is similar to the MV detecting block is extracted from the reference picture. A search is then made for a candidate field motion vector indicating the position of that reference block relative to each of the first and second fields of the MV detecting block (primary search). The primary search operation will be described with reference to FIG. 2.

Figure 2:
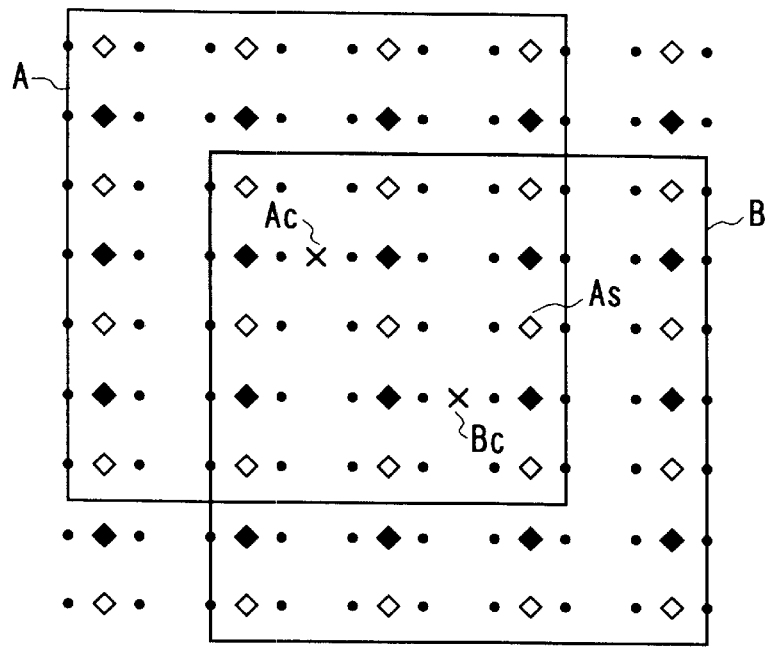
FIG. 2 shows an example of a motion vector primary search region in the first embodiment.

FIG. 2 shows examples of primary search regions set up on the primary search reference picture for subsample points Ca1 and Cb1 in the first and second fields of the primary search MV detecting block shown in FIG. 1B.

In the motion vector primary search, a matching error is computed for four subsample points in the first field of the primary search MV detecting block of FIG. 1B each time the subsample point Ca1 in the first field shown in FIG. 1B is located at a respective one of subsample points in the first and second fields within the search region A centered at point Ac in FIG. 2. That is, the sum of absolute differences in pixel value between the four subsample points in the first field of FIG. 1B and each subsample point within the search region A is computed. In this example, since there are 28 subsample points within the search region A of FIG. 2, a total of 28 matching errors is obtained.

A point As is detected which corresponds to the subsample point Cb1 in the second field of FIG. 1B and for which the matching error is minimum among the 28 matching errors. The relative position of the point As and the subsample point Ca1 is defined as a candidate field motion vector for the first field of the MV detecting block of FIG. 1B.

Next, the search region for the subsample point Cb1 in the second field of FIG. 1B is set up like a search region B centered at a search center point Bc as shown in FIG. 2 taking into consideration the difference in position between the subsample points Cb1 and Ca1. That is, the search center Bc is set such that its position relative to the point As corresponding to the subsample point Ca1 in FIG. 2 is the same as the position of the subsample point Cb1 relative to the subsample point Ca1 in FIG. 1B. More specifically, the search center point Bc corresponds to a point at which the point As is moved by a distance corresponding to a phase by which the interpolated point is shifted between the first and second fields in the horizontal direction.

Next, for the primary search MV detecting block composed of four subsample points in the second field of FIG. 1B, a matching error is computed each time the subsample point Cb1 in the second field of FIG. 1B is located at a respective one of subsample points in the first and second fields within the search region B of FIG. 2. That is, the sum of absolute differences in pixel value between the four subsample points in the second field of FIG. 1B and each subsample point within the search region B is computed. In this case as well, a total of 28 matching errors is obtained since there are 28 subsample points in the search region B of FIG. 2.

A point Bs (not shown) for which the matching error is minimum among the 28 matching errors is detected. The position of the point Bs relative to the subsample point Cb1 is made a candidate field motion vector for the second field of the primary search MV detecting block of FIG. 1B.

In this manner, the primary search for a motion vector, i.e., the search for a candidate field motion vector associated with each of the first and second fields is made.

The secondary search for a motion vector in the motion vector detecting method of the present invention will be described next.

FIGS. 3A, 3B and 3C show the original sample points in partial areas or blocks in the same location on a secondary search reference picture and a secondary search MV detecting picture. More specifically, FIG. 3A shows a reference block in the field motion vector secondary search reference picture. This reference block has samples spaced by one pixel in the horizontal and vertical directions as a result of interpolation between the original samples of the reference picture consisting of the first (or second) field only. FIG. 3B shows the reference block in the frame motion vector secondary search reference picture. This reference block has samples spaced by half pixel in the horizontal and vertical directions by interpolating between the original samples in a reference picture composed of first and second fields.

Figures 4A, 4B:
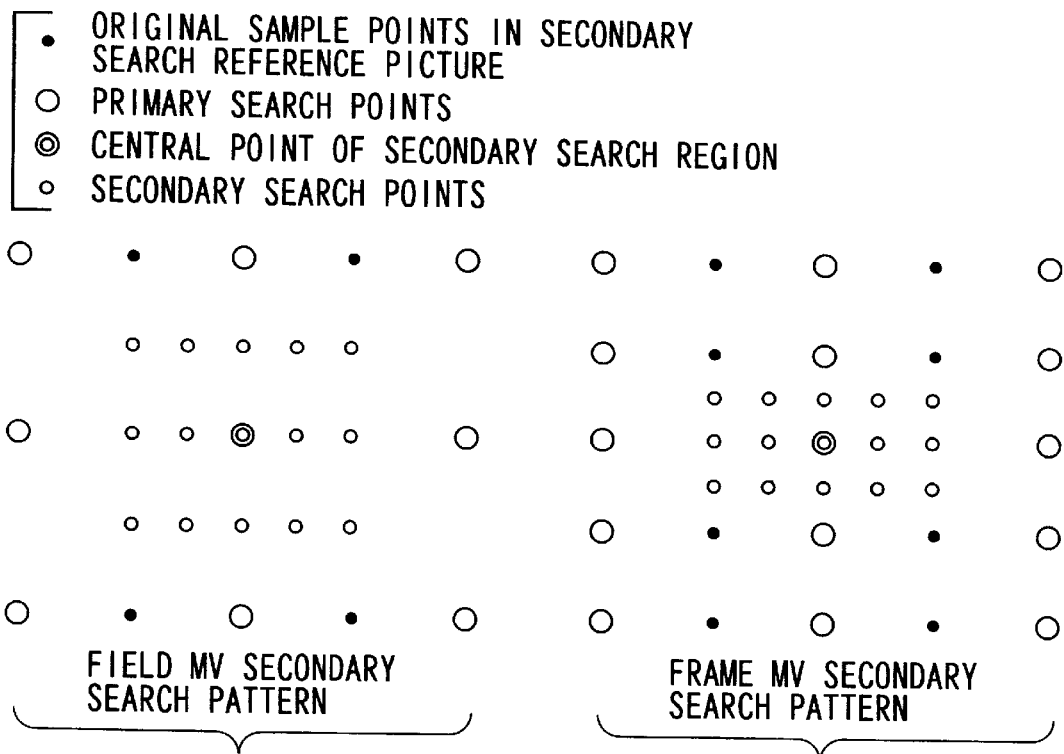
FIGS. 4A and 4B show search points of a field motion vector and a frame motion vector in a secondary search according to a first embodiment of the present invention.

First, the field motion vector secondary search reference picture shown in FIG. 3A is used in the secondary search for a motion vector (field motion vector) associated with a field-based secondary search MV detecting block composed of the original sample points in each of the first and second fields of FIG. 3B. The candidate field motion vectors As and Bs obtained by the primary search for the primary search points Ca1 and Cb1 in the first and second fields shown in FIG. 1B are converted to candidate frame motion vectors associated with search points Ca3 and Cb3 of FIG. 3B. Secondary search points are set as shown in FIG. 4A with a location specified by the conversion as the center of the secondary search region. From these secondary search points, locations for which the matching error is minimum with respect to the secondary search MV detecting blocks each composed of a respective one of the first and second fields are detected as field motion vectors associated with the first and second fields.

In the secondary search for a motion vector (frame motion vector) associated with a frame-based secondary search MV detecting block composed of all the original sample points in the first and second fields shown in FIG. 3C, use is made of the secondary search reference picture shown in FIG. 3B. One or both of the candidate field motion vectors As and Bs obtained by the primary search for the search point Ca1 of FIG. 1B are converted to a candidate frame motion vector associated with one or both of the search points Ca3 and Cb3 of FIG. 3B. Taking the location specified by the conversion to be the center of the secondary search region, secondary search points are set up as shown in FIG. 4B. From these secondary search points, the location for which the matching error is minimum with respect to the frame-based secondary search MV detecting block is detected as a frame motion vector.

Next, the advantages of the present embodiment will be described.

Figure 5:
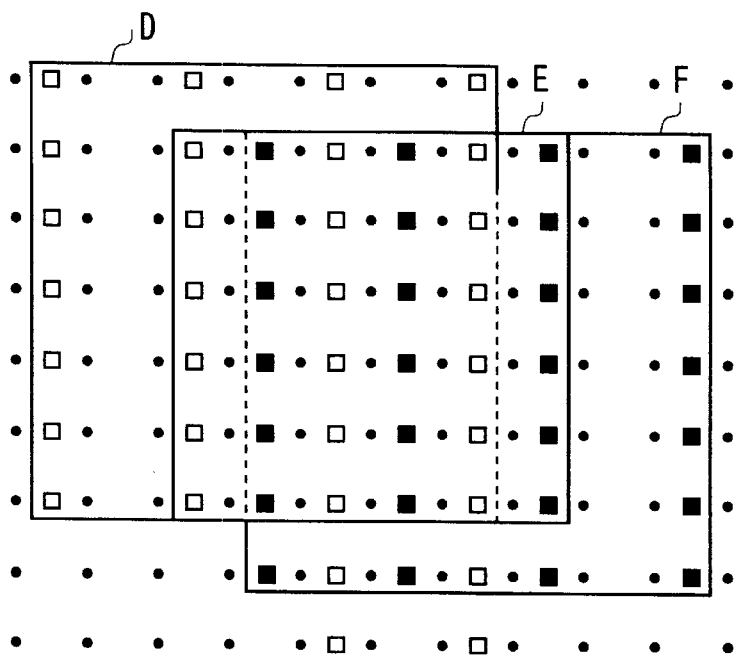
FIG. 5 shows primary search points and primary search region converted to a frame motion vector in the first embodiment.

FIG. 5 shows primary search points and primary search regions for the conversion of the candidate field motion vectors As and Bs obtained in the primary search for the search points Ca1 and Cb1 in the first and second fields of FIG. 1B to candidate frame motion vectors for the search locations Ca3 and Cb3 of FIG. 3B. As shown, the field motion vector primary search region for the first field and the field motion vector primary search region for the second field overlap each other in a region (small-motion region) E in the vicinity of the primary search center points for the search locations Ca2 and Cb2. Therefore, in the overlapping region E, the primary search is performed at one-pixel accuracy for a frame-based MV detecting picture composed of first and second fields, whereas, in the regions (large-motion regions) D and F away from the primary search center points, the primary search is performed at two-pixel accuracy in both the horizontal and vertical directions.

With the conventional motion vector detecting method, the primary search is always performed at two-pixel accuracy irrespective of the magnitude of motion. In contrast, in this embodiment, the primary search with one-pixel accuracy is performed in a small-motion region. That is, according to this embodiment, in the primary search, a candidate motion vector can be detected for small motion at higher accuracy than the conventional method.

Figures 6A, 6B:
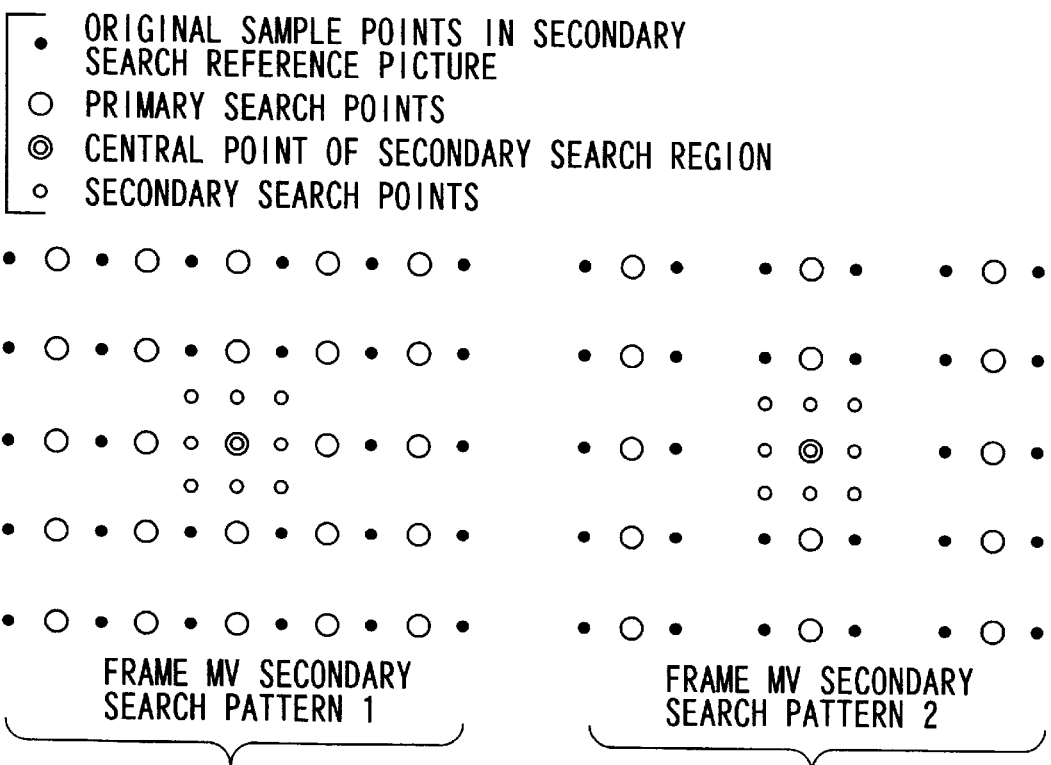
FIGS. 6A and 6B show examples of frame motion vector secondary search patterns.

In the secondary search for a frame motion vector for the secondary search MV detecting block composed of 16 original samples as shown in FIG. 3B, it suffices to detect a location for which the error or difference from the MV detecting block is minimized among secondary search points or locations set up in a small region with its center as the central point of the secondary search (nine points spaced by half pixel in the horizontal and vertical directions as shown in FIG. 6A). Such a small search region is made to accommodate small-motion video scenes for which high-accuracy search is effective.

Under such a situation, for large-motion video scenes, the secondary search region based on the search points set up in a small region is only short of three search points on each of the right and left sides of the region as shown in FIG. 6B. This degree of shortage is not a serious problem since the search accuracy does not much influence the human visual system and the coding efficiency.

According to this embodiment, the amount of computation involved in the secondary search can be reduced more than the conventional motion vector detecting method.

A motion vector detecting method according to a second embodiment of the present invention will be described below in the order of primary search and secondary search.

Figure 7A:
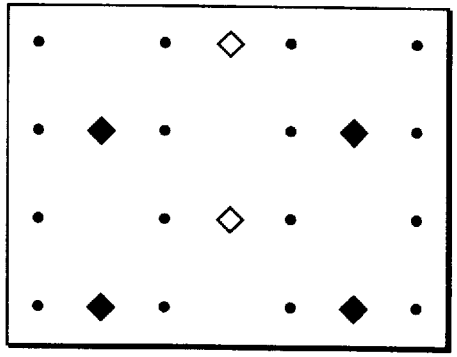
FIGS. 7A and 7B show a primary search reference block and a primary search motion vector detecting block, respectively, in a motion vector detecting method according to a second embodiment of the present invention.
Figure 7B:
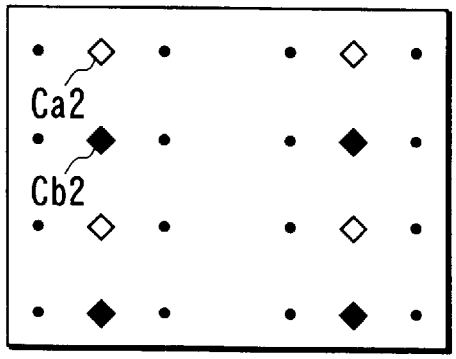

FIGS. 7A and 7B show original sample points and subsample points in a primary search reference block and a primary search MV detecting block in the same location in a primary search reference picture and a primary search MV detecting picture in the second embodiment. As shown, in the second embodiment, the relationship between the subsample points in the primary search reference picture and the subsample points in the primary search MV detecting picture is reversed.

That is, in this embodiment, the subsample points in the primary search reference picture are obtained by first interpolating between the original sample points in the first and second fields constituting one primary search reference picture in the horizontal direction and then removing every other interpolated point or subsample point in difference phases in the horizontal direction in the first and second fields. On the other hand, the subsample points in the primary search MV detecting picture are obtained by first interpolating between the original sample points in the first and second fields constituting one primary search MV detecting picture in the horizontal direction and then removing every other interpolated point in the same phase in the horizontal direction in the first and second fields.

Figure 8:
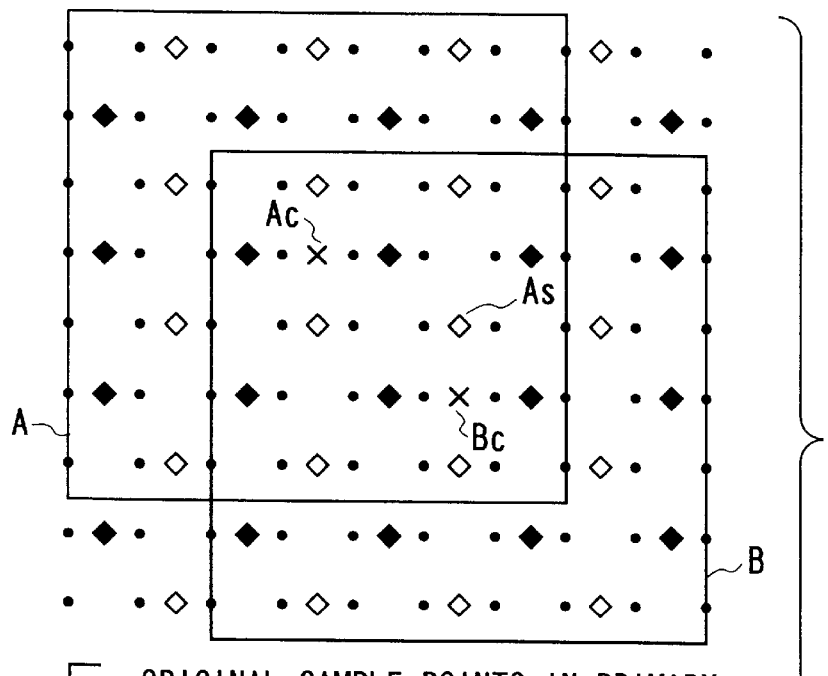
FIG. 8 shows an example of a motion vector primary search region in the second embodiment.

FIG. 8 shows examples of primary search regions for subsample points Ca2 and Cb2 (primary search points) in the first and second fields of the primary search MV detecting block shown in FIG. 1B.

In the motion vector primary search, a matching error is computed for four subsample points in the first field of the primary search MV detecting block of FIG. 7B each time the subsample point Ca1 in the first field shown in FIG. 7B is located at a respective one of subsample points in the first and second fields within the search region A centered at point Ac in FIG. 8. That is, the sum of absolute differences in pixel value between the four subsample points in the first field of FIG. 17 and each subsample point within the search region A is computed. In this example, since there are 28 subsample points within the search region A of FIG. 2, a total of 28 matching errors is obtained.

A location As is detected which corresponds to Ca2 in FIG. 8 and has the minimum matching error among the 28 matching errors. The relative position of the location As and the subsample point Ca1 is defined as a candidate field motion vector for the first field of the MV detecting block of FIG. 7B.

Next, the search region for the subsample point Cb2 in the second field of FIG. 7B is set up like a search region B centered at a point Bc as shown in FIG. 8 taking into consideration the difference in position between the subsample points Cb2 and Ca2. That is, the search center Bc is set such that its position relative to the location As corresponding to Ca2 in FIG. 8 is the same as the position of Cb1 relative to the search point Ca1 in FIG. 7B.

Next, for the primary search MV detecting block composed of four subsample points in the second field of FIG. 7B, a matching error is computed each time the subsample point Cb2 in the second field of FIG. 7B is located at a respective one of subsample points in the first and second fields within the search region B of FIG. 8. That is, the sum of absolute differences in pixel value between the four subsample points in the second field of FIG. 7B and each subsample point within the search region B of FIG. 8 is computed. In this case as well, a total of 28 matching errors is computed since there are 28 subsample points in the search region B of FIG. 2.

A location Bs (not shown) is detected which corresponds to Cb2 in FIG. 8 and for which the matching error is minimum among the 28 matching errors. The position of the point Bs relative to the search point Cb2 is defined as a candidate field motion vector for the second field of the primary search MV detecting block of FIG. 7B.

In this manner, the motion vector primary search, i.e., the search for candidate field motion vectors associated with the first and second fields is made.

Next, the secondary search in the motion vector detecting method of this embodiment will be described with reference to FIGS. 3A, 3B and 3C.

First, the field motion vector secondary search reference picture shown in FIG. 3A is used in the secondary search for a motion vector (field motion vector) associated with a field-based secondary search MV detecting block composed of the original sample points in each of the first and second fields of FIG. 3C. The candidate field motion vectors As and Bs obtained by the primary search for the primary search points Ca2 and Cb2 in the first and second fields shown in FIG. 7B are converted to candidate frame motion vectors associated with search points Ca3 and Cb3 of FIG. 3C. Secondary search points are set as shown in FIG. 4A with a location specified by the conversion as the center of the secondary search region. From these secondary search points, locations for which the matching error is minimum with respect to the secondary search MV detecting blocks each composed of a respective one of the first and second fields are detected as field motion vectors associated with the first and second fields.

In the secondary search for a motion vector (frame motion vector) associated with a frame-based secondary search MV detecting block composed of all the original sample points in the first and second fields shown in FIG. 3B, use is made of the secondary search reference picture shown in FIG. 3B. One or both of the candidate field motion vectors As and Bs obtained by the primary search for the search point Ca2 of FIG. 7B are converted to a candidate frame motion vector associated with one or both of the search points Ca3 and Cb3 of FIG. 3B. Taking the location specified by the conversion to be the center of the secondary search region, secondary search points are set up. The location for which the matching error with the frame-based secondary search MV detecting block is minimum among the secondary search points is detected as a frame motion vector.

The second embodiment provides the same advantages as the first embodiment as will be described below.

Figure 9:
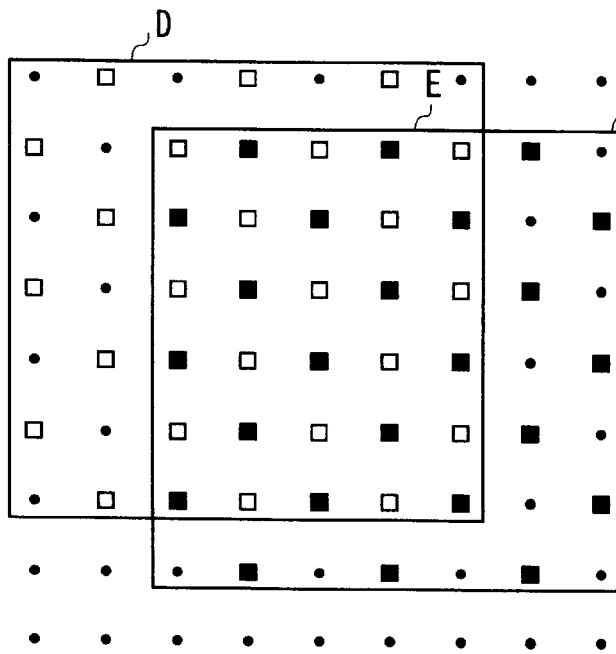
FIG. 9 shows primary search points and primary search region converted to a frame motion vector in the second embodiment.

FIG. 9 shows primary search points and primary search regions for the conversion of the candidate field motion vectors As and Bs obtained in the primary search for the search points Ca2 and Cb2 in the first and second fields of FIG. 7B to candidate frame motion vectors for the search locations Ca3 and Cb3 of FIG. 3C. As shown, the field motion vector primary search region for the first field and the field motion vector primary search region for the second field overlap each other in a region (small-motion region) E in the vicinity of the primary search center points for the search locations Ca2 and Cb2. Therefore, in the overlapping region E, the primary search is performed at one-pixel accuracy, whereas, in the regions (large-motion regions) D and F away from the primary search center points, the primary search is performed at two-pixel accuracy in both the horizontal and vertical directions.

With the conventional motion vector detecting method, the primary search is always performed at two-pixel accuracy irrespective of the magnitude of motion. In contrast, in this embodiment, the primary search with one-pixel accuracy is performed in a small-motion region. That is, according to this embodiment, in the primary search, a candidate motion vector can be detected for small motion at higher accuracy than the conventional method.

Figures 10A, 10B:
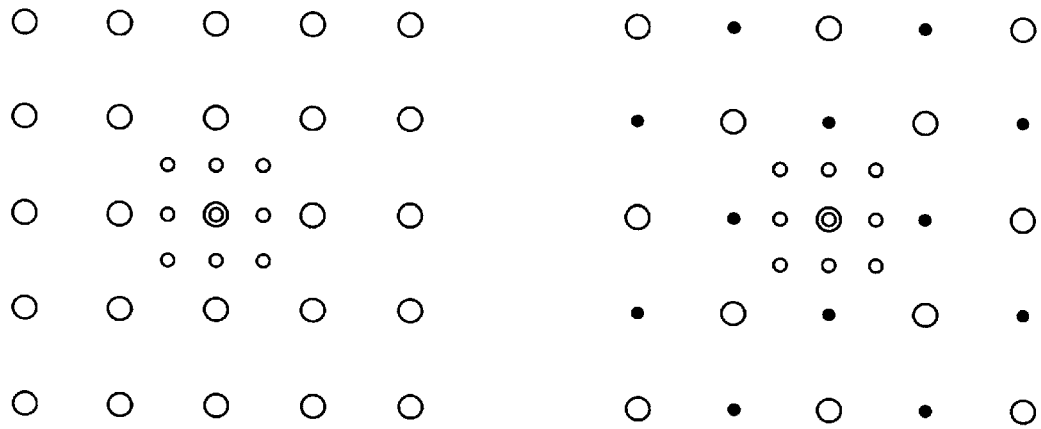
FIGS. 10A and 10B show examples of frame motion vector secondary search patterns.

In the secondary search for a frame motion vector for the secondary search MV detecting block composed of 16 original samples as shown in FIG. 7B, it suffices to detect a location for which the error with the MV detecting block is minimized among secondary search points or locations set up in a small region with its center as the central point of the secondary search region (nine points spaced by half pixel in the horizontal and vertical directions as shown in FIG. 10A). Such a small search region provides for small-motion video scenes for which high-accuracy search is effective.

Under such a situation, for large-motion video scenes, the secondary search region based on the search points set up in a small region is only short of one search point on each of the right and left sides of the region as shown in FIG. 10B. This degree of shortage will offer no problem in practical use since the search accuracy does not have much influence on the human visual system and the coding efficiency.

According to this embodiment, the amount of computation involved in the secondary search can be reduced more than the conventional motion vector detecting method. In the case of large-motion video scenes as well, motion vector detection can be made with high accuracy.

Figure 11A:
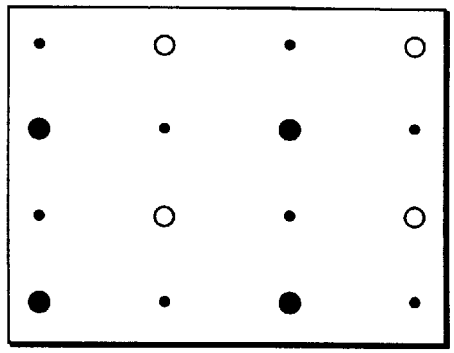
FIGS. 11A and 11B show a primary search reference block and a primary search motion vector detecting block, respectively, in a motion vector detecting method according to a third embodiment of the present invention.
Figure 11B:
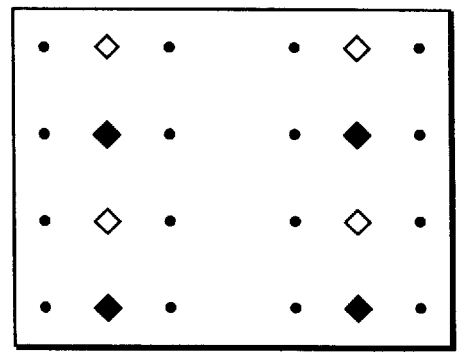

FIGS. 11A and 11B show original sample points and subsample points in a primary search reference block and a primary search MV detecting block in a motion vector detecting method according to a third embodiment of the present invention.

In this embodiment, the subsample points in the primary search reference picture are obtained by removing every other original sample point in difference phases in the horizontal direction in the first and second fields. On the other hand, the subsample points in the primary search MV detecting picture are obtained by first interpolating between the original sample points in the first and second fields constituting one primary search MV detecting picture in the horizontal direction and then removing every other interpolated point in the same phase in the horizontal direction in the first and second fields.

As described previously, in the second embodiment, the subsample points in the primary search reference picture are obtained by, as shown in FIG. 7A, interpolating between the original sample points in the first and second fields along the horizontal direction and removing every other interpolated point in different phases in the first and second fields. In contrast, the third embodiment removes every other original sample point in different phases in the first and second fields without interpolating between original sample points as shown in FIG. 11A.

Therefore, the third embodiment also provides the same advantages as the second embodiment by performing the motion vector detection in the same manner as the second embodiment.

Figure 12A:
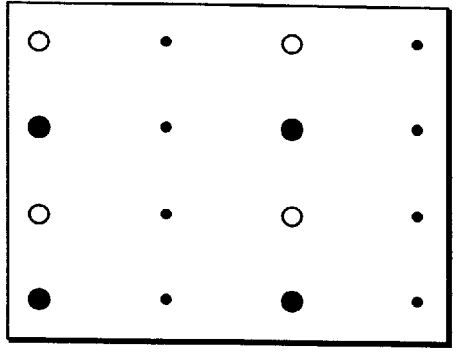
FIGS. 12A and 12B show a primary search reference block and a primary search motion vector detecting block, respectively, in a motion vector detecting method according to a fourth embodiment of the present invention.
Figure 12B:
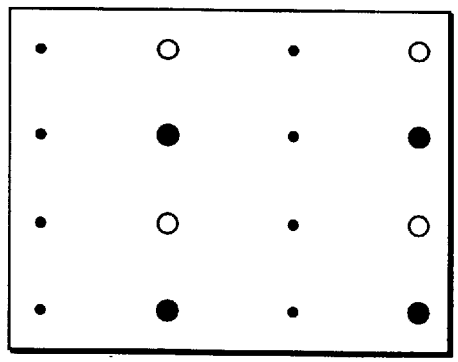

Reference will be next made to FIGS. 12A and 12B to describe a motion vector detecting method according to a fourth embodiment of the present invention.

In this embodiment, two types of primary search MV detecting pictures are used in which original sample points and subsample points are placed as shown in FIGS. 12A and 12B. The pictures are common to each other in that every other original sample point is removed in the same phase in the horizontal direction in the first and second fields to obtain subsample points, but differ from each other in the phase of the subsample points. That is, this embodiment uses two types of primary search MV detecting pictures that are obtained by subsampling one MV detecting picture in difference phases in the horizontal direction.

In this embodiment, in the motion vector primary search, the method described in any of the first, second and third embodiments is used to detect a candidate motion vector for an MV detecting picture (a picture to be coded) that involves a large amount of computation, i.e., an MV detecting picture for which multiple reference pictures are needed.

On the other hand, for an MV detecting picture for which one reference picture will suffice and hence a smaller amount of computation is involved, a primary search MV detecting picture is subsampled in different phases in the horizontal direction as shown in FIGS. 12A and 12B. Candidate field motion vectors associated with each of the first and second fields of the two primary MV detecting blocks are detected from the primary search reference picture shown in either of FIGS. 1A, 7A and 11A. A candidate field motion vector for each of the first and second fields of the MV detecting blocks is determined from the candidate motion vectors.

In this case, since the subsample points in FIGS. 12A and 12B are displaced in phase by one pixel, the determination of field motion vectors for the first and second fields in the manner described above allows candidate field motion vectors to be detected in the primary search with one-pixel accuracy in the horizontal direction while the number of pixels to store a primary search reference picture remains unchanged from that in the conventional method. Thus, errors associated with detecting motion vectors are reduced more than the conventional method. In particular, the motion vector detection errors are reduced when using, as a reference picture, a picture that is produced by interpolating between the original sample points in the horizontal direction and then removing every other interpolated point as shown in FIG. 1A or 7A.

Figure 13:
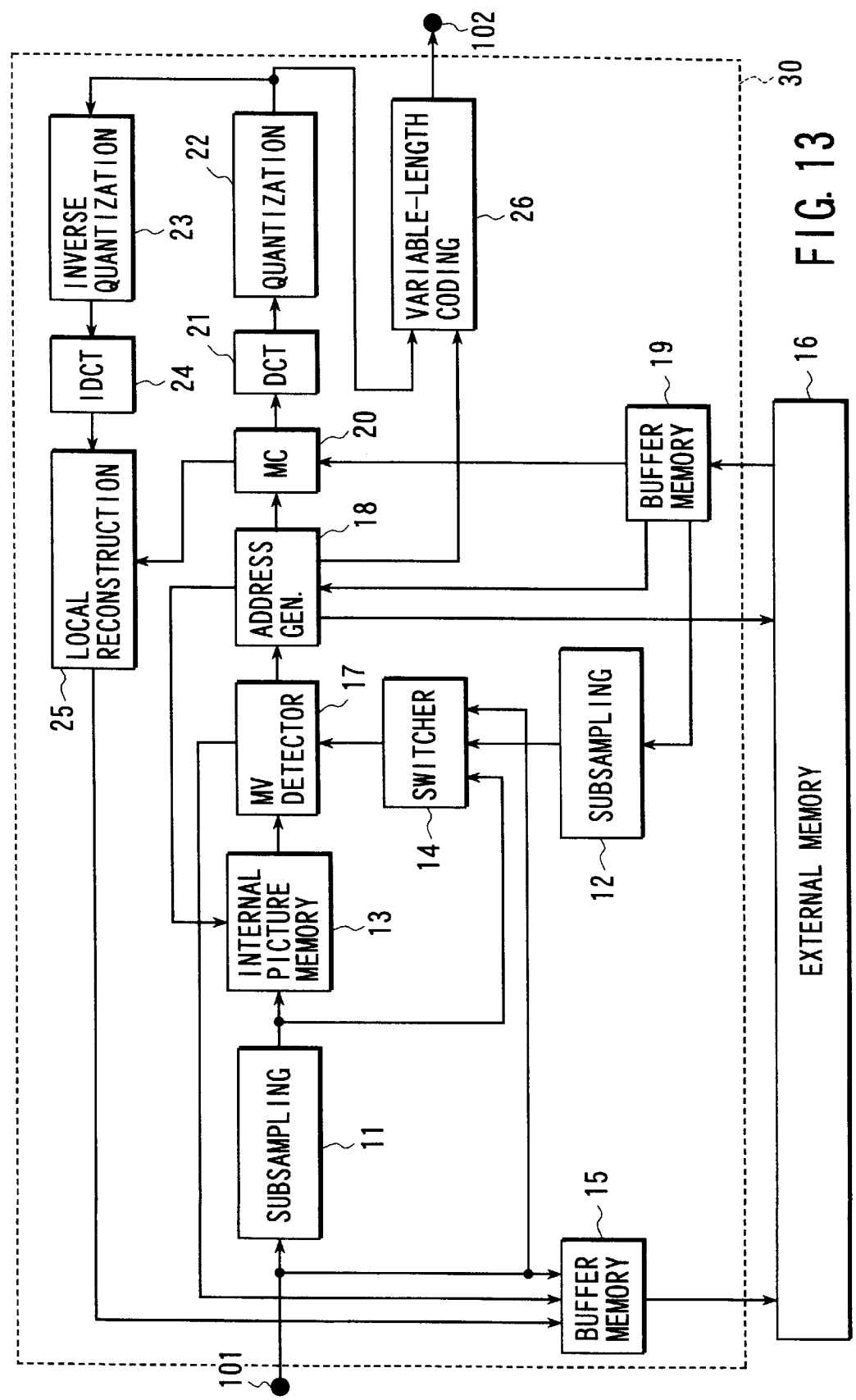
FIG. 13 is a block diagram of a video encoder implementing the motion vector detecting method of the present invention.

Reference will be next made to FIG. 13 to describe a video coder that carries out a motion vector detecting method of the present invention. Here, the video coder will be described as using the motion vector detecting method of the fourth embodiment. Of course, the video coder can be adapted for any of the motion vector detecting methods of the first, second and third embodiments.

Figure 14:
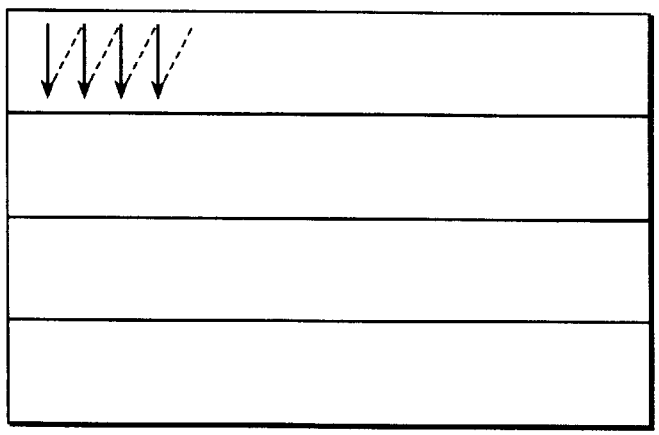
FIG. 14 shows an example of a pixel input format of a picture signal input to the video encoder of FIG. 13.

In FIG. 13, an input terminal 101 receives a to-be-coded video signal in which to-be-coded blocks are arranged in the horizontal direction and intrablock pixels are arranged in the vertical direction as shown in FIG. 14. When the input video signal is a reference picture (a P-picture that is coded with forward-prediction motion compensation), a first subsampling section 11 performs interpolation on the luminance signal in the video signal as shown in FIG. 7 and then eliminates every other sample in different phases in the horizontal direction, thereby producing a primary search reference picture exhibiting different phases between the first and second fields. This picture is stored into an internal image memory 13.

When the input video signal is a picture that does not serve as a reference picture (a B-picture that is coded with bidirectional-prediction motion compensation), the first subsampling section 11 performs interpolation on the video signal in the horizontal direction and then eliminates every other sample in the same phase in the horizontal direction, thereby producing a primary search MV detecting picture exhibiting the same phase between the first and second fields. This picture is applied to a switcher 14 as a primary search forward-prediction MV detecting block picture signal without being stored in the image memory 13.

When the input video signal is a picture that does not serve as a reference picture (a B-picture), a backward prediction MV detecting block picture signal which was applied to the input terminal 101 prior to the reference picture stored in the internal image memory 13 and has been stored in an external memory 16 via a buffer memory 15 is read by addressing of an address generator 18 and then applied to a second subsampling section 12 via a buffer memory 19.

The second sub-sampling section 12 performs interpolation on the backward-prediction MV detecting block picture signal from the buffer memory 19 in the horizontal direction as shown in FIG. 7B and then subsamples the first and second fields in the same phase in the horizontal direction, thereby producing a primary search MV detecting block. This block is then applied to the switcher 14 as a primary search backward-prediction MV detecting block picture signal.

When the input video signal applied to the input terminal 101 is a reference picture, the switcher 14 supplies to a first motion vector detector 17 picture signals of primary search MV detecting blocks into which the input video signal is divided as shown in FIGS. 12A and 12B. When the input video signal is not a reference picture, the switcher supplies to the motion vector detector 17 primary search MV detecting block picture signals from the first and second subsampling sections 11 and 12.

The address generator 18 reads a candidate motion vector detected for the same location of one picture before from the external memory 16 via the buffer memory 19, reads a reference region from a reference picture stored in the internal picture memory 13 on the basis of the candidate motion vector, and applies it to the first motion vector detector 17.

The first motion vector detector 17 detects a candidate motion vector associated with one field of each of primary search reference block picture signals from the internal picture memory 13 and then presents the results of the detection to the address generator 18. The address generator then reads from the internal picture memory a reference block picture signal for the other field of the motion vector detecting block and applies it to the first motion vector detector 17.

The address generator temporarily stores a candidate field motion vector for each of the first and second fields of each of the MV detecting blocks detected by the primary search section (candidate motion vector detector) 17 in the external memory 17 as a candidate frame motion vector together with appropriate information indicating the candidate field motion vectors.

The address generator 18 takes the candidate field motion vectors for the to-be-coded blocks by the primary search section 17 from the external memory 16 and, on the basis of each of the candidate motion vectors, reads a picture signal of a reference block corresponding to a search region as shown in FIG. 16A or 10 and a picture signal of a to-be-coded block and applies them to a secondary search section (second motion vector detector and compensation error calculator) 20 through the buffer memory 19.

The secondary search section 20 detects the difference of the optimum motion vector from the reference motion vector (differential motion vector) and the motion compensation mode from a reference block picture signal from the buffer memory for a to-be-coded block picture signal from the buffer memory and presents the results to the address generator 18. In addition, the secondary search section 20 produces a prediction signal corresponding to the detected motion compensation mode for application to a local reconstruction section 25 and the difference (prediction error data) between the prediction signal and each of pixels in the to-be-coded block to application to a discrete cosine transform (DCT) section 21.

The address generator calculates a final optimum motion vector from the differential motion vector supplied from the secondary search section 20 and applies it to a variable-length coder 26 together with the motion compensation mode signal. The DCT section performs two-dimensional DCT on the prediction error data from the secondary search section 20 to produce DCT coefficients for application to a quantization section 22. The quantization section performs quantization on each of the DCT coefficients by dividing it by a corresponding frequency-dependent quantization width and applies the results to an inverse quantization section 23 and a variable-length coder 26.

The variable length coder multiplexes the motion compensation mode information and the motion vector information from the address generator 18 and the DCT coefficient data from the quantizer 22 in variable-length coded form for application to an output terminal 102 of the coder. The inverse quantizer 23 multiplies each of the DCT coefficients by a corresponding frequency-dependent quantization width to restore the DCT coefficients of the original dynamic range. The restored DCT coefficients are applied to an inverse DCT section 24, which performs inverse DCT on the DCT coefficients from the inverse quantizer 23 to produce local reconstruction prediction error data.

When a coded picture is used as a motion compensation reference picture for a picture to be coded at a later time, the local reconstruction section 25 adds the local reconstruction prediction error data from the inverse DCT section 24 and predicted pixel data from the secondary search section 20 together to produce a locally reconstructed picture signal, which is temporarily stored through the buffer memory 15 into the external memory 15. At this time, in the external memory 16, address locations in which a past reference picture signal that is no longer referenced to has been stored are overwritten by the locally reconstructed picture signal. Here, since a primary search reference picture signal is stored in the internal memory 13 of a video coding LSI 30, the speed with which access is made to the external memory 16 can be reduced significantly.

As described so far, the present invention makes, for either of a reference picture and a motion vector detecting picture in the primary search, the phase of subsample points in the horizontal direction vary between two fields. Further, the present invention makes search regions in the primary search for motion vectors for the first and second fields of a motion vector detecting block to overlap each other in a region corresponding to small motion and selects a candidate frame motion vector from candidate motion vectors detected for the first and second fields of the motion vector detecting block. Thus, an optimum candidate motion vector for the frame-based motion vector detecting block in the primary search can be detected at one-pixel accuracy for a small-motion and high-resolution picture, increasing the detection accuracy in the primary search.

Moreover, by doing so, the number of search locations in the secondary search can be reduced, which results in a reduced amount of computation in detecting a motion vector in the secondary search.

Furthermore, in the present invention, for a to-be-coded picture which requires a reduced amount of computation in the primary search, i.e., a to-be-coded picture which needs no backward prediction-based motion vector detection over a one-picture coding period, a motion vector detecting picture is subsampled in two phases in the horizontal direction to produce two types of primary search motion vector detecting blocks. Candidate motion vectors are detected from nearly equal search regions in the two motion detecting blocks and the optimum candidate motion vector for each field in the motion vector detecting block is selected from the candidate motion vectors for the two primary search motion vector detecting blocks. Thus, a candidate motion vector can be detected at one-pixel accuracy for each field of the motion vector detecting block. This allows the amount of search computation even a small-motion picture involves to be exploited to improve the coding efficiency.

In addition, the number of sampled pixels in a reference picture for primary search remains unchanged from the conventional one, which makes it unnecessary to increase the storage capacity for the reference picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motion vector detecting method comprising the steps of:

producing one of a primary search reference picture and a primary search motion vector detecting picture by sub-sampling first and second fields of an interlaced picture in the same phase in the horizontal direction;

producing the other of the primary search reference picture and the primary search motion vector detecting picture by sub-sampling first and second fields of an interlaced picture in different phases in the horizontal direction;

searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and performing secondary search with the candidate motion vectors taken as the center of search to detect a final field motion vector and a frame motion vector.

2. The method according to claim 1, wherein, when, in the candidate motion vector detecting step, backward-prediction motion vector detection is unnecessary over a coding interval of one picture, a candidate field motion vector is detected using two types of primary search motion vector detecting pictures produced by sub-sampling first and second fields of a motion vector detecting picture in different phases in the horizontal direction.

3. The method according to claim 1, wherein the step of producing one of a reference picture and a motion vector detecting picture comprises substeps of interpolating between original sample points in the first and second fields constituting a picture along the horizontal direction to create interpolated points and sub-sampling every other interpolated point in the same phase in the first and second fields in the horizontal direction.

4. The method according to claim 1, wherein the step of producing the other of the reference picture and the motion vector detecting picture comprises substeps of interpolating between original sample points in the first and second fields constituting a picture along the horizontal direction to create interpolated points and sub-sampling every other interpolated point in different phases in the first and second fields in the horizontal direction.

5. The method according to claim 1, wherein the candidate motion vector detecting step comprises substeps of calculating, each time a predetermined one of multiple subsample points in the first field of the primary search motion vector detecting block is located at a respective one of subsample points in the first and second fields within a search region having a search center, a matching error corresponding to a difference in pixel value between the subsample points in the first field and each subsample point within the search region, detecting a location corresponding to the predetermined subsample point for which the matching error is minimum, and determining the relative position of that location and the predetermined subsample point as a candidate motion vector associated with the first field of the primary search motion vector detecting block.

6. The method according to claim 5, wherein the candidate motion vector detecting step comprises substeps of setting a search region for a predetermined subsample point in the second field as a second search region centered at a location in the second field which corresponds to the location detected for the first field, calculating, each time a predetermined one of multiple subsample points in the first field of the primary search motion vector detecting block is located at a respective one of subsample points in the first and second fields within the second search region, a matching error corresponding to a difference in pixel value between the subsample points in the first field and each subsample point within the second search region, detecting a location corresponding to the predetermined subsample point for which the matching error is minimum, and determining the relative position of that location and the predetermined subsample point as a candidate motion vector associated with the second field of the primary search motion vector detecting block.

7. The method according to claim 6, wherein, in the candidate motion vector detecting step, of candidate motion vectors detected for the first and second fields, a candidate motion vector for which the matching error is minimized is used as a final candidate motion vector.

8. A motion vector detecting method comprising the steps of:

producing a primary search reference picture by sub-sampling a reference picture composed of first and second fields in the same phase in the first and second fields in the horizontal direction;

producing a primary search motion vector detecting picture by sub-sampling a motion vector detecting picture composed of first and second fields in different phases in the first and second fields in the horizontal direction;

searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and performing secondary search with the candidate motion vectors taken as the center of search to detect final field and frame motion vectors.

9. The method according to claim 8, wherein, when, in the candidate motion vector detecting step, backward-prediction motion vector detection is unnecessary over a coding interval of one picture, a candidate field motion vector is detected using two types of primary search motion vector detecting pictures produced by subsampling a motion vector detecting picture composed of first and second fields in different phases in the horizontal direction.

10. A motion vector detecting method comprising the steps of:

producing a primary search reference picture by sub-sampling a reference picture composed of first and second fields in different phases in the first and second fields in the horizontal direction;

producing a primary search motion vector detecting picture by sub-sampling a motion vector detecting picture composed of first and second fields in the same phase in the first and second fields in the horizontal direction;

searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and performing secondary search with the candidate motion vectors taken as the center of search to detect final field and frame motion vectors.

11. The method according to claim 10, wherein, when, in the candidate motion vector detecting step, backward-prediction motion vector detection is unnecessary over a coding interval of one picture, a candidate field motion vector is detected using two types of primary search motion vector detecting pictures produced by subsampling a motion vector detecting picture composed of first and second fields in different phases in the horizontal direction.

12. A motion vector detecting device comprising:

a first sub-sampling section for producing one of a primary search reference picture and a primary search motion vector detecting picture by sub-sampling first and second fields of an interlaced picture in the same phase in the horizontal direction;

a second sub-sampling section for producing the other of the primary search reference picture and the primary search motion vector detecting picture by sub-sampling first and second fields of an interlaced picture in different phases in the horizontal direction;

a candidate motion vector detecting section for searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and a motion vector detecting section for performing secondary search with the candidate motion vectors taken as the center of search to detect final field and frame motion vectors.

13. The device according to claim 12, wherein, when backward-prediction motion vector detection is unnecessary over a coding interval of one picture, the candidate notion vector detecting section detects a candidate field motion vector using two types of primary search motion vector detecting pictures produced by sub-sampling a motion vector detecting picture composed of first and second fields in different phases in the horizontal direction.

14. The device according to claim 12, wherein the first sub-sampling section interpolates between original sample points in the first and second fields constituting a picture along the horizontal direction to create interpolated points and the sub-sampling every other interpolated point in the same phase in the first and second fields in the horizontal direction.

15. The device according to claim 12, wherein the second sub-sampling section interpolates between original sample points in the first and second fields constituting a picture along the horizontal direction to create interpolated points and eliminates every other interpolated point in different phases in the first and second fields in the horizontal direction.

16. The device according to claim 12, wherein the candidate motion vector detecting section calculates, each time a predetermined one of multiple subsample points in the first field of the primary search motion vector detecting block is located at a respective one of subsample points in the first and second fields within a search region having a search center, a matching error corresponding to a difference in pixel value between the subsample points in the first field and each subsample point within the search region, detects a location corresponding to the predetermined subsample point for which the matching error is minimum, and determines the relative position of that location and the predetermined subsample point as a candidate motion vector associated with the first field of the primary search motion vector detecting block.

17. The device according to claim 16, wherein the candidate motion vector detecting section sets a search region for a predetermined subsample point in the second field as a second search region centered at a location in the second field which corresponds to the location detected for the first field, calculates, each time a predetermined one of multiple subsample points in the first field of the primary search motion vector detecting block is located at a respective one of subsample points in the first and second fields within the second search region, a matching error corresponding to a difference in pixel value between the subsample points in the first field and each subsample point within the second search region, detects a location corresponding to the predetermined subsample point for which the matching error is minimum, and determines the relative position of that location and the predetermined subsample point as a candidate motion vector associated with the second field of the primary search motion vector detecting block.

18. The device according to claim 17, wherein the candidate motion vector detecting section uses, of candidate motion vectors detected for the first and second fields, a candidate motion vector for which the matching error is minimized as a final candidate motion vector.

19. A motion vector detecting device comprising:

means for producing a primary search reference picture by sub-sampling a reference picture composed of first and second fields in the same phase in the first and second fields in the horizontal direction;

means for producing a primary search motion vector detecting picture by sub-sampling a motion vector detecting picture composed of first and second fields in different phases in the first and second fields in the horizontal direction;

primary search means for searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and secondary search means for making secondary search with the candidate motion vectors taken as the center of search to detect final field and frame motion vectors.

20. The device according to claim 19, wherein, when backward-prediction motion vector detection is unnecessary over a coding interval of one picture, the primary search means detects a candidate field motion vector using two types of primary search motion vector detecting pictures produced by subsampling a motion vector detecting picture composed of first and second fields in different phases in the horizontal direction.

21. A motion vector detecting device comprising:

means for producing a primary search reference picture by sub-sampling a reference picture composed of first and second fields in different phases in the first and second fields in the horizontal direction;

means for producing a primary search motion vector detecting picture by sub-sampling a motion vector detecting picture composed of first and second fields in the same phase in the first and second fields in the horizontal direction;

primary search means for searching the primary search reference picture for a primary search reference block which is a partial area similar to a primary search motion vector detecting block which is a partial area of the primary search motion vector detecting picture, thereby detecting candidate motion vectors each indicating the location of the primary search reference block relative to a respective one of the first and second fields of the primary search motion vector detecting block; and secondary search means for performing secondary search with the candidate motion vectors taken as the center of search to detect final field and frame motion vectors.

22. The device according to claim 21, wherein, when backward-prediction motion vector detection is unnecessary over a coding interval of one picture, the primary search means detects a candidate field motion vector using two types of primary search motion vector detecting pictures produced by subsampling a motion vector detecting picture composed of first and second fields in different phases in the horizontal direction.

* * * * *